United States Patent
Ezra et al.

(10) Patent No.: US 7,523,329 B2
(45) Date of Patent: Apr. 21, 2009

(54) APPARATUS FOR AND METHOD OF REDUCING POWER CONSUMPTION IN A CABLE MODEM

(75) Inventors: Ronen Ezra, Kfar Saba (IL); Shaul Klein, Herzelia (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/764,914

(22) Filed: Jun. 19, 2007

(65) Prior Publication Data

US 2008/0018427 A1 Jan. 24, 2008

Related U.S. Application Data

(60) Provisional application No. 60/807,736, filed on Jul. 19, 2006.

(51) Int. Cl.
*G06F 1/00* (2006.01)
*G06F 1/26* (2006.01)
*G06F 1/32* (2006.01)
*G06F 11/30* (2006.01)

(52) U.S. Cl. .................. 713/320; 713/300; 713/324; 713/340

(58) Field of Classification Search .................. 713/300, 713/320, 324, 340
See application file for complete search history.

(56) References Cited

U.S. PATENT DOCUMENTS

| | | | |
|---|---|---|---|
| 6,362,762 B1 * | 3/2002 | Jensen et al. | 341/143 |
| 6,498,819 B1 * | 12/2002 | Martin | 375/345 |
| 6,690,655 B1 * | 2/2004 | Miner et al. | 370/278 |
| 6,785,564 B1 | 8/2004 | Quigley et al. | |
| 6,842,478 B1 * | 1/2005 | Ogino | 375/147 |
| 6,879,582 B1 * | 4/2005 | Dhara et al. | 370/352 |
| 7,132,778 B1 | 11/2006 | Nysen et al. | 310/313 |
| 7,233,660 B2 * | 6/2007 | Everett et al. | 379/413 |

(Continued)

OTHER PUBLICATIONS

Michael Harrington, "Channel Bonding Increase Downstream Bit Rates", Communications Technology, Jun. 1, 2005, retrieved from http://www.cable360.net/ct/strategy/emergingtech/15073.html.*

(Continued)

*Primary Examiner*—Thomas Lee
*Assistant Examiner*—Ji H Bae
(74) *Attorney, Agent, or Firm*—Steven A. Shaw; W. James Brady; Frederick J. Telecky, Jr.

(57) ABSTRACT

A novel apparatus and method of reduced power consumption for battery backup operation of a communication device such as a cable modem. When the cable modem senses a failure of the external power source it requests from the cable head-end to switch from multi-channel DOCSIS 3.0 operation to single-channel DOCSIS 2.0 operation. In response to approval by the cable head-end, the cable modem shuts down multi-channel circuits in the PHY such as the wideband analog to digital converter (ADC) which is normally used during multi-channel operation. In its place, it activates narrowband circuitry such as a narrowband ADC which consumes far less power. Tuner filter circuits are also swapped to match the reduced bandwidth requirements of battery backup operation. To further reduce power, the narrower bandwidth requirements during battery backup operation permit the linearity of a programmable gain amplifier (PGA) in the upstream path to be reduced.

23 Claims, 5 Drawing Sheets

U.S. PATENT DOCUMENTS

| | | | |
|---|---|---|---|
| 7,389,528 B1* | 6/2008 | Beser | 725/111 |
| 2002/0193090 A1* | 12/2002 | Sugar et al. | 455/343 |
| 2004/0057576 A1* | 3/2004 | Lavaud et al. | 379/413 |
| 2006/0238301 A1 | 10/2006 | Wu et al. | 340/10.1 |
| 2007/0032256 A1* | 2/2007 | Kolze | 455/522 |

OTHER PUBLICATIONS

DOCSIS 3.0: MAC and Upper Layer Protocols Interface Specification, Cable Television Laboratories Inc., Aug. 4, 2006, pp. 170-179.

* cited by examiner

APPARATUS FOR AND METHOD OF REDUCING POWER CONSUMPTION IN A CABLE MODEM

REFERENCE TO PRIORITY APPLICATION

This application claims priority to U.S. Provisional Application Ser. No. 60/807,736, filed Jul. 19, 2006, entitled "Method and Apparatus to Lower Power Consumption During Battery usage Situation", incorporated herein by reference in its entirety.

FIELD OF THE INVENTION

The present invention relates to the field of data communications and more particularly relates to an apparatus for and method of reducing the power consumption of a cable modem.

BACKGROUND OF THE INVENTION

Currently there are more than 50 million high-speed Internet access customers in North America. Recently, the cable modem has become the broadband connection of choice for many Internet users, being preferred over the nearest rival broadband technology, Digital Subscriber Line (DSL), by a significant margin.

Cable modems are well known in the art. A cable modem is a type of modem that provides access to a data signal sent over the cable television (CATV) infrastructure. Cable modems are primarily used to deliver broadband Internet access, taking advantage of unused bandwidth on a cable television network. In 2005 there were over 22.5 million cable modem users in the United States alone.

A cable modem is a network appliance that enables high speed data connections to the internet via data services provided by the local cable company. Data from the home is sent upstream on a carrier that operates on the 5 MHz to 42 MHz band of the cable spectrum. Downstream data is carried on a 88 MHz to 860 MHz band. The cable modem system can have additional networking features such as Voice over IP (VoIP), wireless connectivity or network switch or hub functionality.

The term cable Internet access refers to the delivery of Internet service over the cable television infrastructure. The proliferation of cable modems, along with DSL technology, has enabled broadband Internet access in many countries. The bandwidth of cable modem service typically ranges fro 3 Mbps up to 40 Mbps or more. The upstream bandwidth on residential cable modem service usually ranges from 384 kbps to 30 Mbps or more. In comparison, DSL tends to offer less speed and more variance between service packages and prices. Service quality is also far more dependent on the client's location in relation to the telephone company's nearest central office or Remote Terminal.

Users in a neighborhood share the available bandwidth provided by a single coaxial cable line. Therefore, connection speed varies depending on how many people are using the service at the same time. In most areas this has been eliminated due to redundancy and fiber networks.

With the advent of Voice over IP telephony, cable modems are also be used to provide telephone service. Many people who have cable modems have opted to eliminate their Plain Old Telephone Service (POTS). An alternative to cable modems is the Embedded Multimedia Terminal Adapter (EMTA). An EMTA allows multiple service operators (MSOs) to offer both High Speed Internet and VoIP through a single piece of customer premise equipment. A multiple system operator is an operator of multiple cable television systems.

Many cable companies have launched Voice over Internet Protocol (VoIP) phone service, or digital phone service, providing consumers a true alternative to standard telephone service. Digital phone service takes the analog audio signals and converts them to digital data that can be transmitted over the hybrid fiber coaxial (HFC) network of the cable company. Cable digital phone service is currently available to the majority of U.S. homes with a large number of homes are now subscribing. The number of homes subscribing is currently growing by hundreds of thousands each quarter. One significant benefit of digital phone service is the substantial consumer savings, with one recent study saying residential cable telephone consumers could save an average of $135 or more each year.

The Data Over Cable Service Interface Specification (DOCSIS) compliant cable modems have been fueling the transition of cable television operators from a traditional core business of entertainment programming to a position as full-service providers of video, voice, and data telecommunications services.

The latest DOCSIS specification, DOCSIS 3.0, include a number of enhancements, most notably, channel bonding and support for IPv6. Channel bonding provides cable operators with a flexible way to increase upstream and downstream throughput to customers, with data rates in the hundreds of megabits and potentially gigabits per second. DOCSIS 3.0 increases the capacity of cable modems to a minimum of 160 Mbps downstream to customers and to a minimum of 120 Mbps upstream.

Cable systems transmit digital data signals over radio frequency (RF) carrier signals. To provide two-way communication, one carrier signal carries data in the downstream direction from the cable network to the customer and another carrier signal carries data in the upstream direction from the customer to the cable network. Cable modems are devices located at the subscriber premises that functions to convert digital information into a modulated RF signal in the upstream direction, and to convert the RF signals to digital information in the downstream direction. A cable modem termination system (CMTS) performs the opposite operation for multiple subscribers at the cable operator's head-end.

Typically, several hundreds of users share a 6 MHz downstream channel and one or more upstream channels. The downstream channel occupies the space of a single television transmission channel in the cable operator's channel lineup. It is compatible with digital set top MPEG transport stream modulation (64 or 256 QAM), and provides up to 40 Mbps. A media access control (MAC) layer coordinates shared access to the upstream bandwidth.

In order to provide faster data rates to customers, DOCSIS 3.0 introduces the concept of bonding several physical downstream channels into one virtual high speed pipe. Channel bonding is a load-sharing technique for logically combining multiple DOCSIS channels. DOCSIS 3.0 defines channel bonding for both the upstream and downstream directions. For downstream channel bonding, each downstream DOCSIS channel carries a payload of approximately 38 Mbps (50 Mbps with EuroDOCSIS). Load sharing traffic across multiple channels allows a maximum throughput of up to N×38 Mbps (or N×50 Mbps), with N representing the number of channels being bonded. A separate 6 MHz or 8 MHz frequency is used for each of the bonded channels. Upstream channel bonding is possible for a minimum of four channels, 10 to 30 Mbps each, for a total of 40 to 120 Mbps of shared throughput.

Cable modems and DOCSIS standard have made delivery of digital services over hybrid fiber coaxial (HFC) cable television systems possible. Digital data delivery of Internet data, video on demand movies, telephony, telephony over the Internet, interactive games, upstream delivery of security camera digital photos to security services and a host of other applications is now possible. These services and applications are useful and valuable with some requiring more bandwidth than others. Video and movies, for example, even when compressed using MPEG standards, require large amounts of bandwidth.

The high speed and bandwidth requirements of these applications create demands on the power consumption of user equipment. Power consumption, however, is normally not a major concern considering that most cable modem boxes are connected to AC mains utility power. In general, a power failure is not considered a critical event as televisions and computers are not likely to be operating. Regarding telephony, however, regulatory bodies in some countries require the telephone network to operate even in the event of a power failure. Thus, cable modems that provide telephony features in addition to Internet, video and other data services, must continue to operate for a certain duration of time (e.g., 8 hours) in the event of a power failure. Power for such continued operation is typically provided from a battery.

Thus, there is a need for a mechanism that is capable of lowering the power consumption of cable modem equipment during battery backup mode of operation so as to maximize operating time of the telephony features.

SUMMARY OF THE INVENTION

The present invention is a novel apparatus and method of reducing the power consumption of a communications device such as a cable modem. The reduced power consumption mechanism of the present invention is applicable to communication systems wherein it is desirable to significantly reduce power consumption during battery operation. The mechanism is particularly suitable for use in cable systems adapted to implement the DOCSIS 3.0 specification which permits the fallback of the cable modem to DOCSIS 2.0 operation whereby operation switches from multi-channel (i.e. DOCSIS 3.0) to single-channel (i.e. DOCSIS 2.0) operation.

When the cable modem senses a failure of the external power source it requests from the cable head-end to switch from multi-channel DOCSIS 3.0 operation to single-channel DOCSIS 2.0 operation. In response to approval by the cable head-end, the cable modem shuts down multi-channel circuits in the PHY such as the wideband analog to digital converter (ADC) which is normally used during multi-channel operation. In its place, it activates narrowband circuitry such as a narrowband ADC which consumes far less power. Tuner filter circuits are also swapped to match the reduced bandwidth requirements of battery backup operation. To further reduce power, the narrower bandwidth requirements during battery backup operation permit the linearity of a programmable gain amplifier (PGA) in the upstream path to be reduced by decreasing its current draw.

To aid in understanding the principles of the present invention, the description is provided in the context of a DOCSIS 3.0 capable cable system comprising a cable modem adapted to receive an RF feed from a cable head-end (i.e. CMTS) and to distribute video, Internet and telephony to a subscriber premises. It is appreciated, however, that the invention is not limited to use with any particular communication device or standard and may be used in optical, wired and wireless applications. Further, the invention is not limited to use with a specific technology but is applicable to any situation where it is desired to reduce the power consumption during battery operation of the device.

Several advantages of the reduced power consumption mechanism include (1) the mechanism enables usage of a single wideband tuner and a single wide band ADC during normal operation in contrast with prior art solutions that require several narrow band tuners and ADCs requiring much higher power consumption; (2) during battery backup mode operation, the wideband ADC, which has higher power consumption, is shut down and a narrowband ADC is activated.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of reducing power consumption in a cable modem coupled to a cable head-end and incorporating a PHY circuit having a normally active multi-channel wideband mode and single-channel narrowband mode of operation, the method comprising the steps of sensing loss of external power to the cable modem, requesting from the cable head-end to switch to the single-channel narrowband mode of operation and upon approval from the cable head-end, shutting down the multi-channel wideband mode of operation and activating the single-channel narrowband mode of operation.

There is also provided in accordance with the invention, an apparatus for reducing power consumption in a cable modem coupled to a cable modem termination service (CMTS) comprising a power supply control circuit coupled to an external power source and a battery, the power supply control circuit operative to sense a failure of the external power source and switch to battery backup, an analog front end (AFE) circuit comprising a wideband analog to digital converter (ADC) and a narrowband ADC and a wideband/narrowband (WB/NB) control circuit operative to receive an indication of a loss of external power from the power supply circuit and to shut down the wideband ADC and activate the narrowband ADC in response thereto.

There is further provided in accordance with the invention, a method of reducing power consumption in a cable modem coupled to a cable head-end and incorporating a PHY circuit having a normally active multi-channel wideband mode and single-channel narrowband mode of operation, the method comprising the steps of switching from the multi-channel wideband mode of operation to the single-channel narrowband mode of operation in response to sensing a loss of external power to the cable modem and switching from the single-channel narrowband mode of operation back to the multi-channel wideband mode of operation in response to sensing the restoration of external power to the cable modem.

There is also provided in accordance with the invention, a method of reducing power consumption in a communications device incorporating a PHY circuit having a normally active multi-channel wideband mode and single-channel narrowband mode of operation, the method comprising the steps of sensing loss of external power to the communications device, requesting to switch to the single-channel narrowband mode of operation and upon approval, shutting down the multi-channel wideband mode of operation and activating the single-channel narrowband mode of operation.

There is further provided in accordance with the invention, a cable modem coupled to a cable head-end over a cable network comprising a memory, one or more interface ports, a tuner coupled to a CATV cable having a plurality of channels, the tuner operative to tune a received broadband signal in accordance with a tune command, a PHY circuit coupled to the tuner comprising a wideband analog to digital converter (ADC) and a narrowband ADC, the PHY circuit operative to generate a baseband signal from the output of the tuner, means for reducing power consumption of the cable modem in the event of a loss of external power comprising means for sensing loss of external power to the cable modem, means for requesting from the cable head-end to switch to the single-channel narrowband mode of operation, upon approval from the cable head-end, shutting down the multi-channel wideband mode of operation and activating the single-channel narrowband mode of operation.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
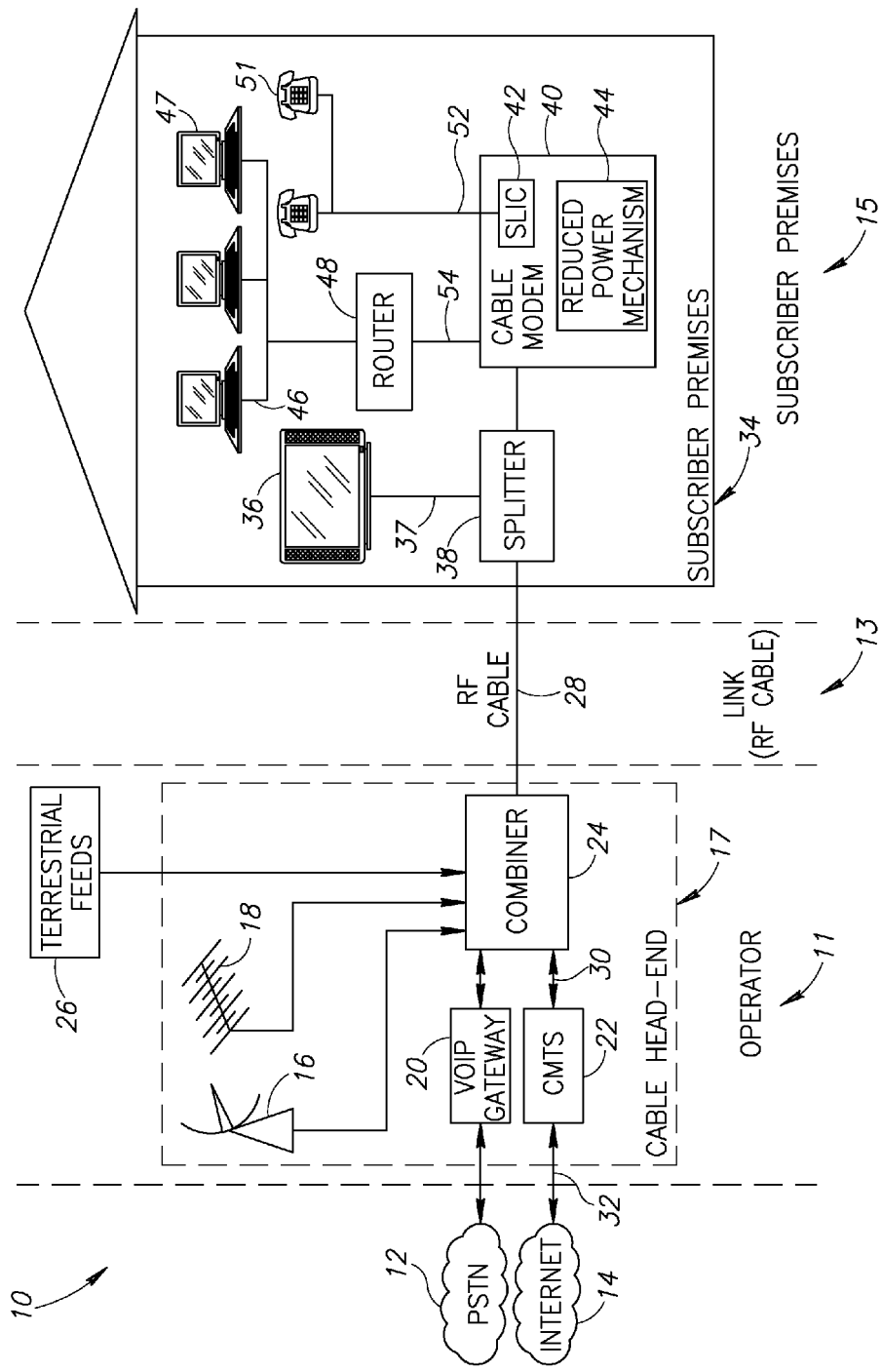
FIG. 1 is a block diagram illustrating a cable system incorporating the power consumption reduction mechanism of the present invention.

The following notation is used throughout this document.

| Term | Definition |
|---|---|
| AC | Alternating Current |
| ADC | Analog to Digital Converter |
| AFE | Analog Front End |
| ASIC | Application Specific Integrated Circuit |
| ATM | Asynchronous Transfer Mode |
| CATV | Community Antenna Television or Cable TV |
| CM | Cable Modem |
| CMTS | Cable Modem Termination System |
| CO | Central Office |
| CPU | Central Processing Unit |
| DAC | Digital to Analog Converter |
| DBC | Dynamic Bonding Change |
| DC | Direct Current |
| DHCP | Dynamic Host Control Protocol |
| DOCSIS | Data Over Cable Service Interface Specification |
| DSID | Downstream Service ID |
| DSL | Digital Subscriber Line |
| DSP | Digital Signal Processor |
| DVR | Digital Video Recorder |

-continued

| Term | Definition |
|---|---|
| EEROM | Electrically Erasable Read Only Memory |
| EMTA | Embedded Multimedia Terminal Adapter |
| FPGA | Field Programmable Gate Array |
| GPIO | General Purpose I/O |
| HDL | Hardware Description Language |
| HFC | Hybrid Fiber Coaxial |
| I/O | Input/Output |
| IC | Integrated Circuit |
| IP | Internet Protocol |
| LAN | Local Area Network |
| LED | Light Emitting Diode |
| MAC | Media Access Control |
| MPEG | Moving Picture Experts Group |
| MSO | Multiple Service Operator |
| NB | Narrowband |
| PC | Personal Computer |
| PDA | Personal Digital Assistant |
| PGA | Programmable Gain Amplifier |
| POTS | Plain Old Telephone Service |
| PSTN | Public Switched Telephone Network |
| QAM | Quadrature Amplitude Modulation |
| QoS | Quality of Service |
| RAM | Random Access Memory |
| RF | Radio Frequency |
| ROM | Read Only Memory |
| SLIC | Subscriber Line Interface Card |
| SONET | Synchronous Optical Network |
| TV | Television |
| USB | Universal Serial Bus |
| VoIP | Voice over IP |
| WAN | Wide Area Network |
| WB | Wideband |
| WLAN | Wireless Local Area Network |

DETAILED DESCRIPTION OF THE INVENTION

The present invention is a novel apparatus and method of reducing the power consumption of a communications device such as a cable modem. The reduced power consumption mechanism of the present invention is applicable to communication systems wherein it is desirable to significantly reduce power consumption during battery operation. The mechanism is particularly suitable for use in cable systems adapted to implement the DOCSIS 3.0 specification which permits the fallback of the cable modem to DOCSIS 2.0 operation whereby operation switches from multi-channel (i.e. DOCSIS 3.0) to single-channel (i.e. DOCSIS 2.0) operation.

To aid in understanding the principles of the present invention, the description is provided in the context of a DOCSIS 3.0 capable cable system comprising a cable modem adapted to receive an RF feed from a cable head-end (i.e. CMTS) and to distribute video, Internet and telephony to a subscriber premises. It is appreciated, however, that the invention is not limited to use with any particular communication device or standard and may be used in optical, wired and wireless applications. Further, the invention is not limited to use with a specific technology but is applicable to any situation where it is desired to reduce the power consumption during battery operation of the device.

Note that throughout this document, the term communications device is defined as any apparatus or mechanism adapted to transmit, or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof.

The term cable modem is defined as a modem that provides access to a data signal sent over the cable television infrastructure. The term voice cable modem is defined as a cable modem that incorporates VoIP capabilities to provide telephone services to subscribers. Channel bonding is defined as a load-sharing technique for logically combining multiple DOCSIS channels into a single virtual pipe. It is described in detail in the DOCSIS 3.0 specification, incorporated herein by reference in its entirety.

Cable System Incorporating Reduced Power Consumption Mechanism

A block diagram illustrating a cable modem system incorporating the reduced power consumption mechanism of the present invention is shown in FIG. 1. The system, generally referenced 10, comprises an operator portion 11 connected to the public switched telephone network (PSTN) 12 and the Internet 14 or other wide area network (WAN), a link portion 13 comprising the RF cable 28 and a subscriber portion 15 comprising the subscriber premises 34.

The operator portion 11 comprises the cable head-end 17 which is adapted to receive a number of content feeds such as satellite 16, local antenna 18 and terrestrial feeds 26, all of which are input to the combiner 24. The cable head-end also comprises the voice over IP (VoIP) gateway 20 and Cable Modem Termination System (CMTS) 22. The combiner merges the TV programming feeds with the RF data from the CMTS.

The Cable Modem Termination System (CMTS) is a computerized device that enables cable modems to send and receive packets over the Internet. The IP packets are typically sent over Layer 2 and may comprise, for example, Ethernet or SONET frames or ATM cell. It inserts IP packets from the Internet into MPEG frames and transmits them to the cable modems in subscriber premises via an RF signal. It does the reverse process coming from the cable modems. A DOCSIS-compliant CMTS enables customer PCs to dynamically obtain IP addresses by acting as a proxy and forwarding DHCP requests to DHCP servers. A CMTS may provide filtering to protect against theft of service and denial of service attacks or against hackers trying to break into the cable operator's system. It may also provide traffic shaping to guarantee a specified quality of service (QoS) to selected customers. A CMTS may also provide bridging or routing capabilities.

The subscriber premises 34 comprises a splitter 38, cable appliances 36 such as televisions, DVRs, etc., cable modem 40, router 48, PCs or other networked computing devices 47 and telephone devices 51. Cable service is provided by the local cable provider wherein the cable signal originates at the cable head end facility 17 and is transmitted over RF cable 28 to the subscriber premises 34 where it enters splitter 38. One output of the splitter goes to the televisions, set top boxes, and other cable appliances via internal cable wiring 37.

The other output of the splitter comprises the data portion of the signal which is input to the cable modem 40. The cable modem is adapted to provide both Ethernet and USB ports. Typically, a router 48 is connected to the Ethernet port via Ethernet cable 54. One or more network capable computing devices 47, e.g., laptops, PDAs, desktops, etc. are connected to the router 48 via internal Ethernet network wiring 46. In addition, the router may comprise or be connected to a wireless access point that provides a wireless network (e.g., 802.11b/g/a) throughout the subscriber premises.

The cable modem also comprises a subscriber line interface card (SLIC) 42 which provides the call signaling and functions of a conventional local loop to the plurality of installed telephone devices 51 via internal 2-wire telephone wiring 52. In particular, it generates call progress tones including dial tone, ring tone, busy signals, etc. that are normally provided by the local loop from the CO. Since the telephone deices 51 are not connected to the CO, the SLIC in the cable modem must provide these signals in order that the telephone devices operate correctly.

The cable modem also comprises the reduced power consumption mechanism 44 of the present invention. The power line detector is operative to sense an external power source failure and switch to battery operation which includes switching operation of the cable modem PHY from multi-channel (DOCSIS 3.0) operation to single-channel (DOCSIS 2.0) operation, as described in more detail infra.

Voice Cable Modem Incorporating Reduced Power Consumption Mechanism

Figure 2:
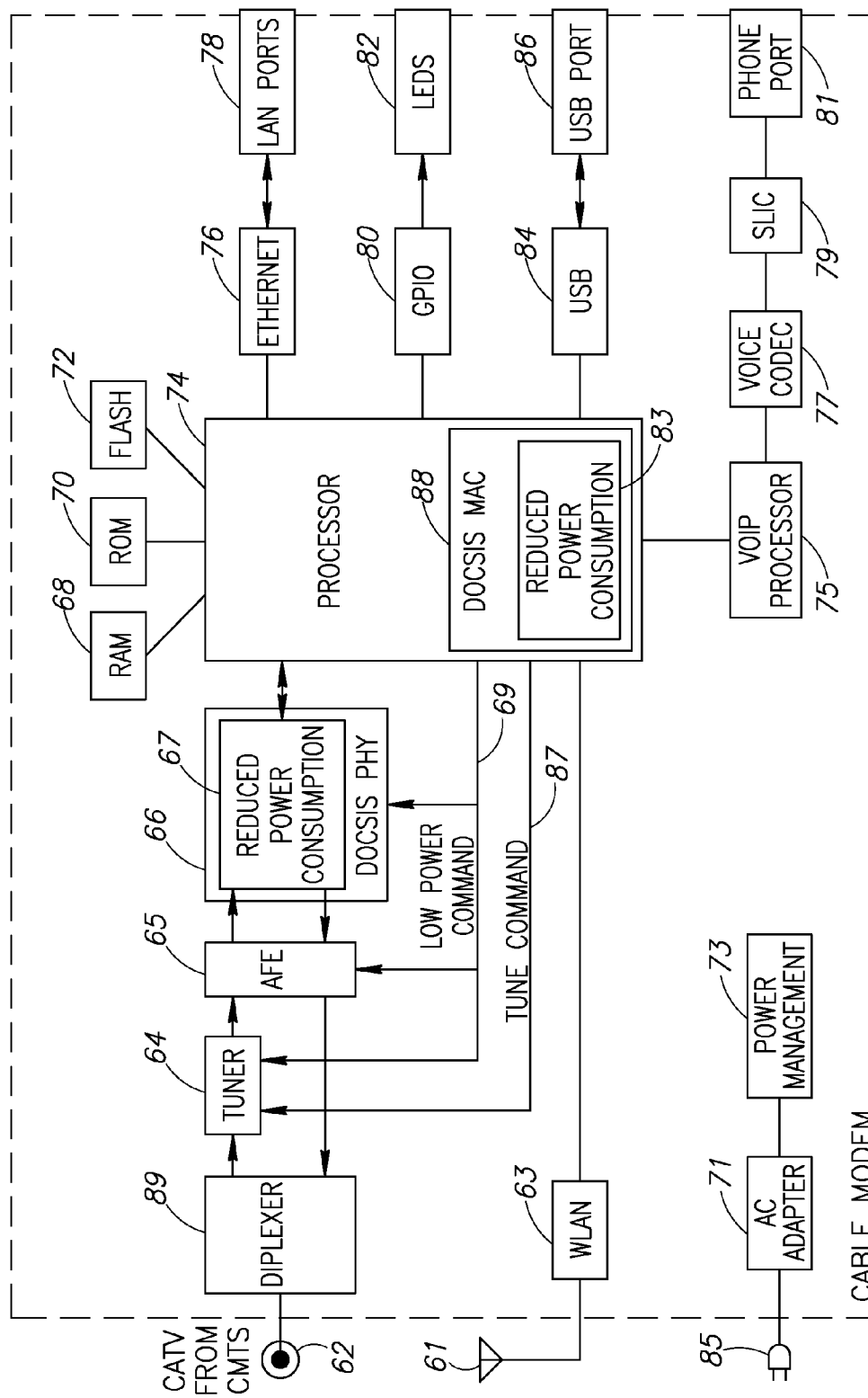
FIG. 2 is a block diagram illustrating an example cable modem incorporating the power consumption reduction mechanism of the present invention.

A block diagram illustrating an example cable modem incorporating the reduced power consumption mechanism of the present invention is shown in FIG. 2. The cable modem, generally referenced 60, comprises a diplexer 89, tuner 64, analog front end (AFE) circuit 65, DOCSIS PHY circuit 66 incorporating a reduced power consumption block 67, DOCSIS compatible processor 74 incorporating the reduced power consumption block 83 within the DOCSIS MAC 88, VoIP processor 75, voice codec 77, subscriber line interface card (SLIC) 79, phone port 81, antenna 61, wireless local area network (WLAN) 63, Ethernet interface 76, Ethernet LAN port 78, general purpose (I/O) (GPIO) interface 80, LEDs 82, universal serial bus (USB) interface 84, USB port 86, AC adapter 71, power management circuit 73, ROM 68, RAM 70 and FLASH memory 72. Note that in the example embodiment presented herein, the cable modem and DOCSIS enabled processor 74 are adapted to implement the DOCSIS 3.0 standard which provides for channel bonding wherein multiple downstream channels are used to transmit data from the CMTS to the cable modem. A plurality of contexts may be established whereby packets are sent over multiple downstream channels and recombined at the cable modem to yield several separate contexts.

In operation, the cable modem processor 74 is the core chip set which in the example presented herein comprises a central single integrated circuit (IC) with peripheral functions added. Depending on the implementation, one or more of the functions shown external to the processor may be implemented within the processor without departing from the scope of the invention. For example, the AFE and PHY circuits may be implemented within the processor integrated circuit (IC) 74.

The voice over IP (VoIP) processor 75 implements a mechanism to provide phone service outside the standard telco channel. Chipset DSPs and codecs 77 add the functionality of POTS service for low rate voice data.

The cable modem also comprises a subscriber line interface card (SLIC) 79 which functions to provide the signals and functions of a conventional local loop to a plurality of telephone devices connected via the phone port 81 using internal 2-wire telephone wiring. In particular, it generates call progress tones including dial tone, ring tone, busy signals, etc. that are normally provided by the local loop from the CO. Since the telephone deices are not connected to the CO, the SLIC in the cable modem must provide these signals in order that the telephone devices operate correctly.

In a traditional analog telephone system, each telephone or other communication device (i.e. subscriber unit) is typically interconnected by a pair of wires (commonly referred to as tip and ring or together as subscriber lines, subscriber loop or phone lines) through equipment to a switch at a local telephone company office (central office or CO). At the CO, the tip and ring lines are interconnected to a SLIC which provides required functionality to the subscriber unit. The switches at the central offices are interconnected to provide a network of switches thereby providing communications between a local subscriber and a remote subscriber.

The SLIC is an essential part of the network interface provided to individual analog subscriber units. The functions provided by the SLIC include providing talk battery (between 5 VDC for on-hook and 48 VDC for off-hook), ring voltage (between 70-90 VAC at a frequency of 17-20 Hz), ring trip, off-hook detection, and call progress signals such as ringback, busy, and dial tone.

A SLIC passes call progress tones such as dial tone, busy tone, and ringback tone to the subscriber unit. For the convenience of the subscriber who is initiating the call, these tones normally provided by the central office give an indication of call status. When the calling subscriber lifts the handset or when the subscriber unit otherwise generates an off hook condition, the central office generates a dial tone and supplies it to the calling subscriber unit to indicate the availability of phone service. After the calling subscriber has dialed a phone number of the remote (i.e. answering) subscriber unit, the SLIC passes a ring back sound directed to the calling subscriber to indicate that the network is taking action to signal the remote subscriber, i.e. that the remote subscriber is being rung. Alternatively, if the network determines that the remote subscriber unit is engaged in another call (or is already off-hook), the network generates a busy tone directed to the calling subscriber unit.

The SLIC also acts to identify the status to, or interpret signals generated by, the analog subscriber unit. For example, the SLIC provides −48 volts on the ring line, and 0 volts on the tip line, to the subscriber unit. The analog subscriber unit provides an open circuit when in the on-hook state. In a loop start circuit, the analog subscriber unit goes off-hook by closing, or looping the tip and ring to form a complete electrical circuit. This off-hook condition is detected by the SLIC (whereupon a dial tone is provided to the subscriber). Most residential circuits are configured as loop start circuits.

Connectivity is provided by a standard 10/100/1000 Mbps Ethernet interface 76 and Ethernet LAN port 78, USB interface 84 and USB port 86 or with additional chip sets, such as wireless 802.11a/b/g via WLAN interface 63 coupled to antenna 61. In addition, a GPIO interface 80 provides an interface for LEDs 82, etc. The network connectivity functions may also include a router or Ethernet switch core. Note that the DOCSIS MAC 88 and PHY 66 are typically integrated into the cable modem processor 74 or may be separate as shown in FIG. 2 wherein the DOCSIS PHY circuit 66 is shown separate from the processor 74.

In the example embodiment presented herein, the diplexer 89 is coupled to the CATV signal from the CMTS via port 62 and is operative to coupled the receive and transmit signals to the CATV cable. The tuner 64 is operative to convert the RF signal received over the RF cable to an IF frequency in accordance with a tune command received from the processor.

The cable modem 60 comprises a processor 74 which may comprise a digital signal processor (DSP), central processing unit (CPU), microcontroller, microprocessor, microcomputer, ASIC, FPGA core or any other suitable processing means. The cable modem also comprises static read only memory (ROM) 68, dynamic main memory 70 and FLASH memory 72 all in communication with the processor via a bus (not shown).

The magnetic or semiconductor based storage device 68 (i.e. RAM) is used for storing application programs and data. The cable modem comprises computer readable storage medium that may include any suitable memory means, including but not limited to, magnetic storage, optical storage, semiconductor volatile or non-volatile memory, biological memory devices, or any other memory storage device.

Software adapted to implement the reduced power consumption mechanism of the present invention is adapted to reside on a computer readable medium, such as a magnetic disk within a disk drive unit. Alternatively, the computer readable medium may comprise a floppy disk, removable hard disk, Flash memory 72, EEROM based memory, bubble memory storage, ROM storage 70, distribution media, intermediate storage media, execution memory of a computer, and any other medium or device capable of storing for later reading by a computer a computer program implementing the system and methods of this invention. The software adapted to implement the reduced power consumption mechanism of the present invention may also reside, in whole or in part, in the static or dynamic main memories 68 or in firmware within the processor of the computer system (i.e. within microcontroller, microprocessor or microcomputer internal memory).

Figure 3:
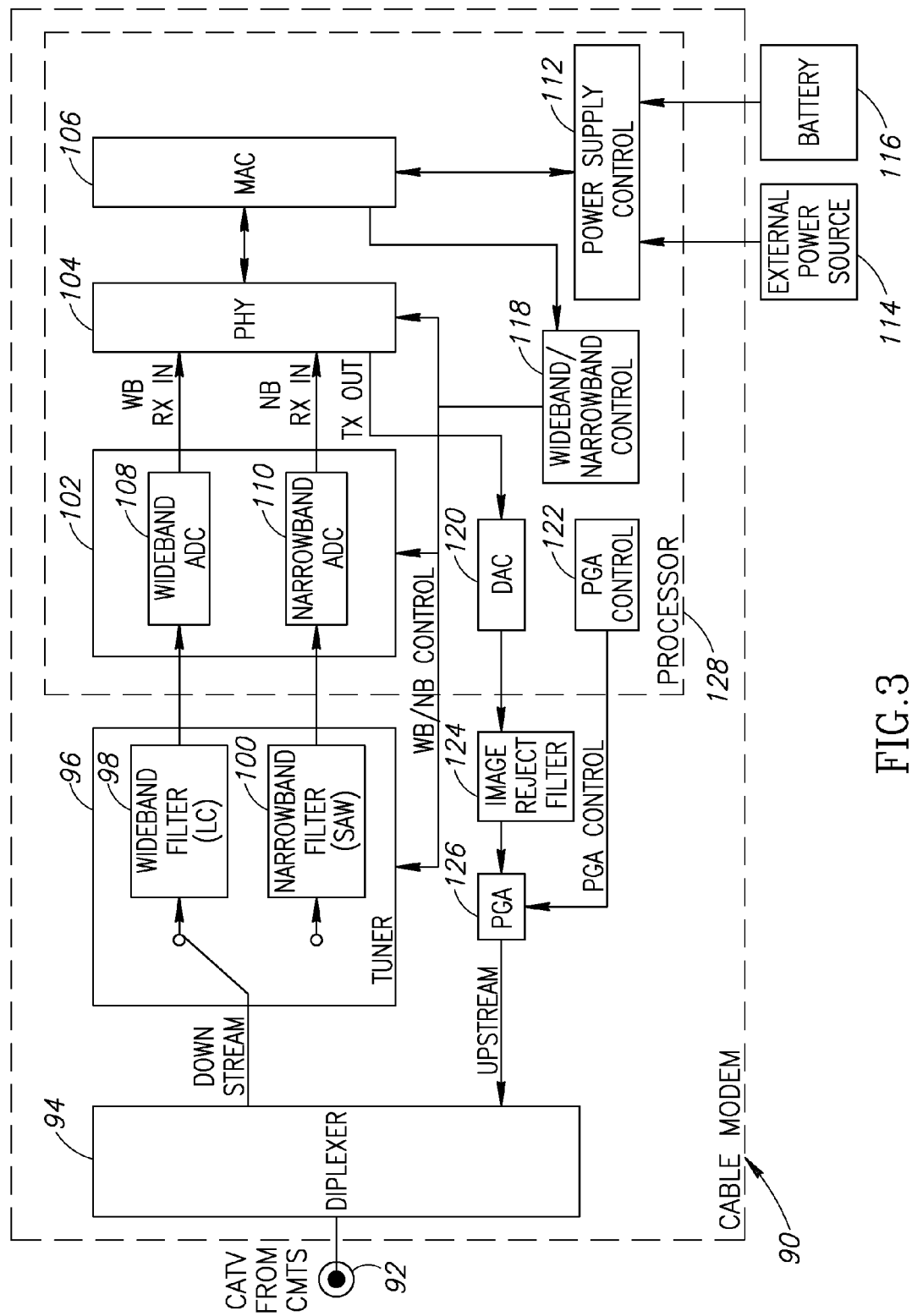
FIG. 3 is a block diagram illustrating an example embodiment of the cable modem power consumption reduction mechanism of the present invention in more detail.

A block diagram illustrating an example embodiment of the cable modem power consumption reduction mechanism of the present invention in more detail is shown in FIG. 3. The portion of the cable modem circuit shown in more detail, generally referenced 90, comprises a diplexer 94 coupled to the CATV cable 92, tuner 96 comprising a wideband filter 98 such as an LC filter and a narrowband filter 100 such as a surface acoustic wave (SAW) filter, analog front end (AFE) circuit 102 comprising a wideband analog to digital converter (ADC) 108 and narrowband ADC 110, PHY circuit 104, MAC 106, power supply control 112 coupled to an external power source 114, battery 116, wideband/narrowband (WB/NB) control circuit 118, digital to analog converter (DAC) 120, image reject filter 124, programmable gain amplifier (PGA) 126 and PGA control circuit 122.

The mechanism of the present invention enables the use of a single wideband tuner and single wideband ADC during normal operation (i.e. using external power source). During battery mode operation, the wideband ADC, which has higher power consumption, is shut down and a narrowband ADC is activated in its place.

During operation on external power, the wideband ADC in the PHY is used in the receive path. The wideband ADC is capable of supporting multi-channel DOCSIS 3.0 operating bandwidth of 64 MHz (or more). The current consumption during this mode is relatively high but is not much of a concern due to the fact that power is supplied from an external source, typically the AC mains utility power.

During a power failure, however, depending on the location, the cable modem is required to continue to provide VOIP telephony services and support to allow users to make telephone calls during a power failure. The cable modem must support VOIP for a defined finite time period, such as 8 hours. In order to meet this requirement, in accordance with the invention, the WB/NB control 118 in the cable modem switches from multi-channel to single-channel operation. This permits the shutting down of the high power consuming circuitry such as the wideband ADC 108 in the AFE. In its place, the WB/NB control circuit activates the narrowband ADC 110 which consumes significantly less power. Further reductions in power consumption are achieved by configuring the PGA 126 to draw less current.

Figure 4:
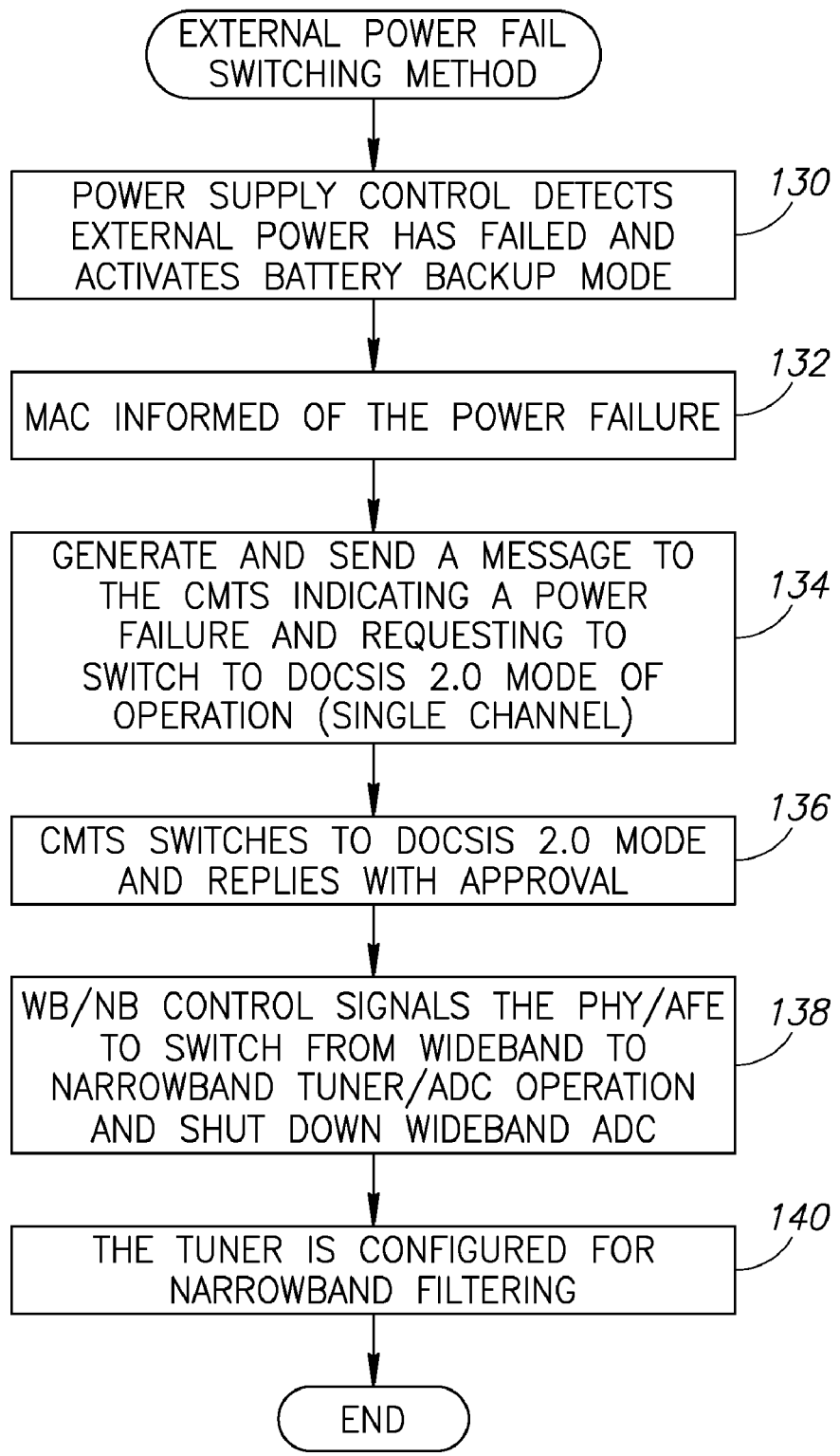
FIG. 4 is a flow diagram illustrating the external power failure switching method of the present invention.

The external power failure switching method of the invention will now be described in more detail. A flow diagram illustrating the external power failure switching method of the present invention is shown in FIG. 4. With reference to FIGS. 3 and 4, the power supply control circuit 112 functions to sense the loss of external power source 114 (step 130). This is achieved using any suitable technique well-known in the art. The power supply circuit informs the MAC 106 or other entity in the cable modem via signaling or other means that external power has been lost (step 132).

In response, the MAC or other suitable entity on the processor generates a message to the cable head-end (i.e. to the CMTS) indicating that due to the occurrence of a power failure, it is requesting to switch to DOCSIS 2.0 single-channel mode operation (step 134). For example, the DOCSIS 3.0 standard CM-STATUS message with event type code set to '9' can be used to request this switch from the CMTS. Table 1 below provides the relevant portions of Table 6-55 Event Type Codes from Section 6.4.34.2 of the standard specification.

narrowband ADC thus greatly reducing power consumption. Since the cable modem is communicating to the CMTS over a single channel, the wideband ADC needed for multi-channel operation is not necessary. Further, the tuner is configured to use the complementary narrowband SAW filter rather than the wideband LC filter (step 140).

To further reduce power consumption, the PGA control circuit 122 reduces the current consumption of the PGA which results in reduced linearity of the amplifier 126. The reduction in linearity, however, is tolerable considering the narrowband communications (i.e. single-channel) between the cable modem and the CMTS. Thus, by controlling the linearity of the PGA during single channel DOCSIS 2.0 operation, further reductions in power consumption are achieved.

Figure 5:
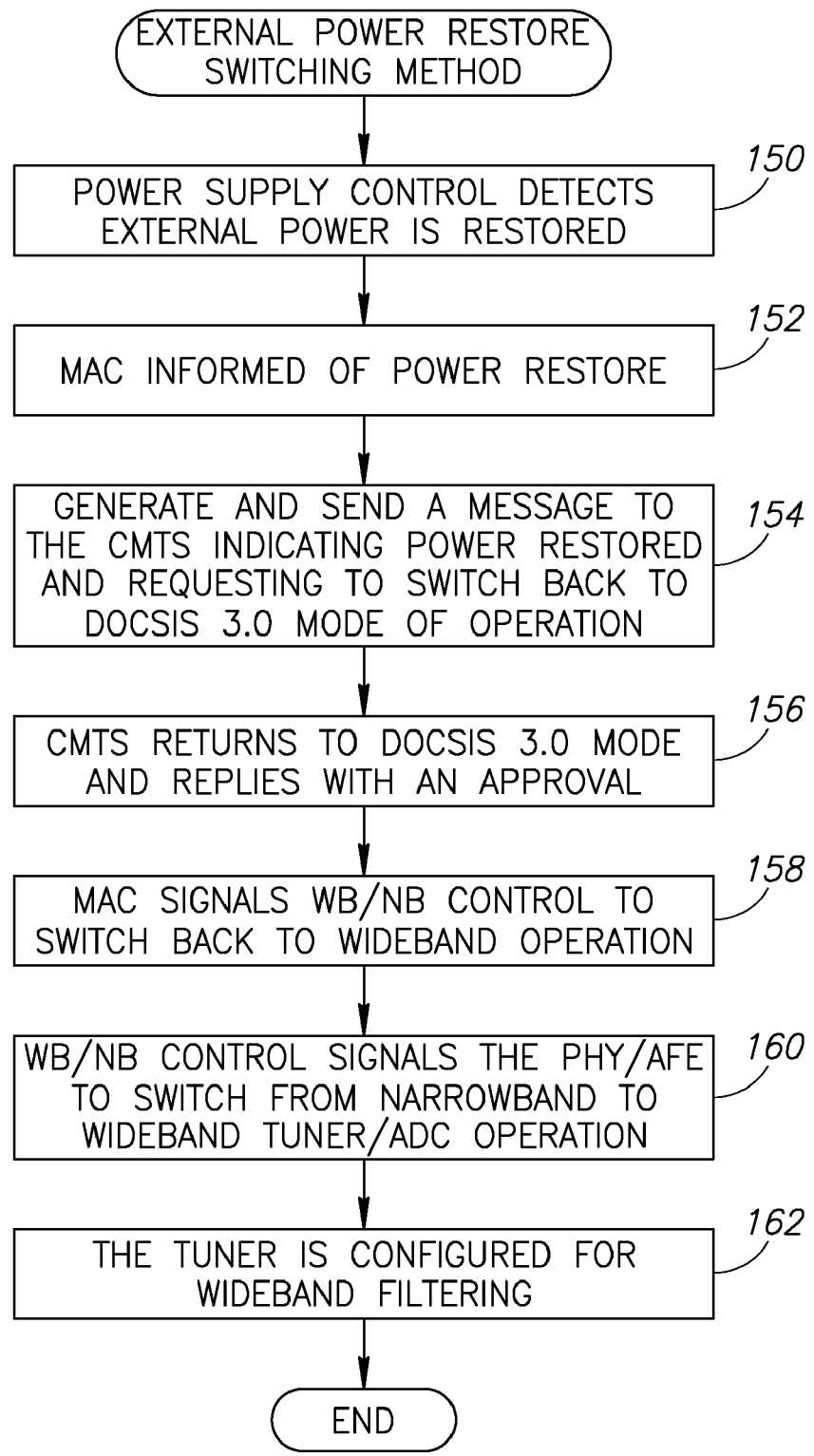
FIG. 5 is a flow diagram illustrating the external power restore method of the present invention.

The external power restore method of the invention will now be described in more detail. A flow diagram illustrating the external power restore method of the present invention is shown in FIG. 5. With reference to FIGS. 3 and 5, at some point later in time the power supply control circuit 112 senses that external power 114 has been restored (step 150). The power supply control circuit signals the MAC accordingly (step 152) and a message is generated and sent to the CMTS

TABLE 1

Portion of Table 6-55 Event Type Codes from DOCSIS 3.0 Specification

| | Status Report Events | | Parameters Reported | | |
|---|---|---|---|---|---|
| Event Type Code Event Condition | Trigger Event to 'on' | Trigger Event to 'off' | Downstream Channel ID | Upstream Channel ID | DSID |
| 9 CM operating on battery backup | CM detects loss of A/C Power for more than 5 seconds and the CM is operating on battery backup. | CM detects the presence of A/C Power and has returned from backup battery to operating on A/C power. | N/A | N/A | N/A |
| 10 CM returned to A/C power | CM detects the presence of A/C Power for more then 5 seconds and has returned from backup battery to operating on A/C power. | CM detects loss of A/C Power and the CM is operating on battery backup. | N/A | N/A | N/A |

Note that the cable modem (CM) power events 9 and 10 presented in Table 1 above are only applicable to cable modems with battery backup capability. These events are used by the cable modem to signal the CMTS when the cable modem is operating on battery power. If the CMTS receives a CM-STATUS message with "CM operating on battery backup" indicated, the CMTS sends a dynamic bonding change (DBC) message to the cable modem to reduce the cable modem operation to a single upstream and single downstream channel. This functions to prevent shortened battery life if cable modem operation is left in multi-channel transmission and reception.

In response to the CM-STATUS message, the CMTS switches to DOCSIS 2.0 operation for the requesting cable modem and replies with an approval (step 136). Upon receiving an approval, the WB/NB control in the cable modem signals the PHY/AFE to switch from wideband to narrowband operation with respect to the tuner, AFE and PHY circuits (step 138). In particular, the WB/NB control circuit is operative to shut down the wideband ADC and activate the in the cable head-end indicating that external power has been restored and the cable modem is requesting to switch back to DOCSIS 3.0 multi-channel operation (step 154). In the context of DOCSIS 3.0, a CM-STATUS message with Event Type Code set to 10, as shown in Table 1 presented supra, is sent to the CMTS.

In response, the CMTS returns to DOCSIS 3.0 operation for the requesting cable modem and replies with an approval (step 156). Upon receiving the approval, the MAC or other suitable entity, signals the WB/NB control circuit 118 to switch back to wideband operation (step 158). The WB/NB control circuit signals the tuner, AFE and PHY circuits to switch to narrowband operation (step 160). In particular, the narrowband ADC is shutdown and the wideband ADC is activated. Further, the tuner is configured to use the wideband filter 98 rather than the narrowband filter 100 (step 162).

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of reducing power consumption in a cable modem coupled to a cable head-end and incorporating a PHY circuit having a normally active multi-channel wideband mode and single-channel narrowband mode of operation, said method comprising the steps of:

sensing loss of external power to said cable modem;

requesting from said cable head-end to switch to said single-channel narrowband mode of operation; and upon approval from said cable head-end, shutting down said multi-channel wideband mode of operation and activating said single-channel narrowband mode of operation by configuring a tuner circuit to switch to a narrow band intermediate frequency (IF) channel utilizing a surface acoustic wave (SAW) filter circuit.

2. The method according to claim 1, wherein said step of activating said single-channel narrowband mode of operation comprises the steps of:

shutting down a wideband analog to digital converter (ADC) circuit; and activating a narrowband ADC circuit.

3. The method according to claim 1, wherein said single-channel narrowband mode of operation comprises Data Over Cable Service Interface Specification (DOCSIS) 2.0 single-channel operation.

4. The method according to claim 1, wherein said multi-channel wideband mode of operation comprises Data Over Cable Service Interface Specification (DOCSIS) 3.0 multiple channel operation.

5. The method according to claim 1, wherein said step of requesting comprises sending a Data Over Cable Service Interface Specification (DOCSIS) 3.0 CM-STATUS message to a cable modem termination system (CMTS) indicating a loss of external power.

6. The method according to claim 1, wherein said step of activating comprises the step of lowering a sampling clock rate of an analog to digital converter (ADC).

7. An apparatus for reducing power consumption in a cable modem coupled to a cable modem termination service (CMTS), comprising:

a power supply control circuit coupled to an external power source and a battery, said power supply control circuit operative to sense a failure of said external power source and switch to battery backup;

an analog front end (AFE) circuit comprising a wideband analog to digital converter (ADC) and a narrowband ADC; and a wideband/narrowband (WB/NB) control circuit operative to receive an indication of a loss of external power from said power supply circuit and to shut down said wideband ADC and activate said narrowband ADC in response thereto, wherein said WB/NB control circuit further comprises means for configuring a tuner circuit coupled to said AFE to switch to a narrow band intermediate frequency (IF) channel utilizing a surface acoustic wave (SAW) filter circuit in the event of a loss of external power.

8. The apparatus according to claim 7, wherein said WB/NB control circuit is operative to shut down said wideband ADC and activate said narrowband ADC upon approval from said CMTS.

9. The apparatus according to claim 7, wherein said narrowband ADC is used during Data Over Cable Service Interface Specification (DOCSIS) 2.0 single-channel operation.

10. The apparatus according to claim 7, wherein said wideband ADC is used during Data Over Cable Service Interface Specification (DOCSIS) 3.0 multiple channel operation.

11. The apparatus according to claim 7, wherein said WB/NB control circuit is operative to lower a sampling clock rate of an analog to digital converter (ADC) circuit within said AFE in the event of a loss of external power.

12. A method of reducing power consumption in a cable modem coupled to a cable head-end and incorporating a PHY circuit having a normally active multi-channel wideband mode and single-channel narrowband mode of operation, said method comprising the steps of:

switching from said multi-channel wideband mode of operation to said single-channel narrowband mode of operation in response to sensing a loss of external power to said cable modem;

configuring a tuner circuit to switch to a narrow band intermediate frequency (IF) channel utilizing a surface acoustic wave (SAW) filter circuit; and switching from said single-channel narrowband mode of operation back to said multi-channel wideband mode of operation in response to sensing the restoration of external power to said cable modem.

13. The method according to claim 12, comprising the steps of:

shutting down a wideband analog to digital converter (ADC) circuit; and activating a narrowband ADC circuit.

14. The method according to claim 12, wherein said step of switching from said single-channel narrowband mode of operation back to said multi-channel wideband mode of operation comprises the steps of:

configuring the tuner circuit to switch to a wideband intermediate frequency (IF) channel;

shutting down a narrowband analog to digital converter (ADC) circuit; and activating a wideband ADC circuit.

15. The method according to claim 12, wherein said single-channel narrowband mode of operation comprises Data Over Cable Service Interface Specification (DOCSIS) 2.0 single-channel operation.

16. The method according to claim 12, wherein said multi-channel wideband mode of operation comprises Data Over Cable Service Interface Specification (DOCSIS) 3.0 multiple channel operation.

17. The method according to claim 12, wherein said step of requesting comprises sending a Data Over Cable Service Interface Specification (DOCSIS) 3.0 CM-STATUS message to a cable modem termination system (CMTS) indicating a loss of external power.

18. The method according to claim 13, wherein said step of activating comprises the step of lowering a sampling clock rate of an analog to digital converter (ADC).

19. A method of reducing power consumption in a communications device incorporating a PHY circuit having a normally active multi-channel wideband mode and single-channel narrowband mode of operation, said method comprising the steps of:

sensing loss of external power to said communications device;

requesting to switch to said single-channel narrowband mode of operation; and upon approval, shutting down said multi-channel wideband mode of operation and activating said single-channel narrowband mode of operation; and configuring a tuner circuit to switch to a narrow band intermediate frequency (IF) channel utilizing a surface acoustic wave (SAW) filter circuit.

20. The method according to claim 19, further comprising the steps of:

sensing the restoration of external power to said communications device;

requesting to switch to said multi-channel wideband mode of operation; and upon approval, shutting down said single-channel narrowband mode of operation and activating said multi-channel wideband mode of operation.

21. A cable modem coupled to a cable head-end over a cable network, comprising:

a memory;

one or more interface ports;

a tuner coupled to a CATV cable having a plurality of channels, said tuner operative to tune a received broadband signal in accordance with a tune command;

a PHY circuit coupled to said tuner comprising a wideband analog to digital converter (ADC) and a narrowband ADC, said PHY circuit operative to generate a baseband signal from the output of said tuner;

a programmable gain amplifier (PGA) in an upstream path;

means for reducing power consumption of said cable modem in the event of a loss of external power operative to decrease the current consumption of said PGA thereby reducing its linearity resulting in a reduction in power consumption of said cable modem, said means for reducing power consumption comprising:

means for sensing loss of external power to said cable modem;

means for requesting from said cable head-end to switch to said single-channel narrowband mode of operation;

upon approval from said cable head-end, shutting down said multi-channel wideband mode of operation and activating said single-channel narrowband mode of operation.

22. The cable modem according to claim 21, wherein said means for reducing power consumption further comprises:

means for sensing the restoration of external power to said cable modem;

means for requesting to switch to said multi-channel wideband mode of operation; and means for upon approval, shutting down said single-channel narrowband mode of operation and activating said multi-channel wideband mode of operation.

23. The cable modem according to claim 21, wherein said tuner comprises a wideband intermediate frequency (IF) channel and a narrowband IF channel wherein said step of activating comprises configuring said tuner to use said narrowband IF channel.

\* \* \* \* \*